No. 767,634. PATENTED AUG. 16, 1904.
D. E. CROUCH.
CROSSCUT SAWING APPARATUS.
APPLICATION FILED JAN. 28, 1904.
NO MODEL.

WITNESSES:
INVENTOR
Daniel E. Crouch
BY
Geo. H. Strong.
ATTORNEY

No. 767,634.

Patented August 16, 1904.

UNITED STATES PATENT OFFICE.

DANIEL E. CROUCH, OF TOLLHOUSE, CALIFORNIA.

CROSSCUT-SAWING APPARATUS.

SPECIFICATION forming part of Letters Patent No. 767,634, dated August 16, 1904.

Application filed January 28, 1904. Serial No. 190,936. (No model.)

*To all whom it may concern:*

Be it known that I, DANIEL E. CROUCH, a citizen of the United States, residing at Tollhouse, in the county of Fresno and State of California, have invented new and useful Improvements in Crosscut-Sawing Apparatus, of which the following is a specification.

My invention relates to an apparatus which is especially designed for sawing trees or large logs into lengths.

It consists in mounting a saw of any suitable or desired length in a traveler which is movable between horizontally-disposed guides and connecting the traveler with a chain which is movable about sprocket-wheels fixed at any desired distance apart to provide the requisite length of stroke of the saw. A vertical guide is disposed upon the traveler having a length equal to the distance between the two parts of the chain, and a roller travels in this vertical guide, the shaft of said roller being connected with the chain, so that power being transmitted to drive the chain the traveler and the saw will be moved any required distance, depending upon the distance between the sprocket-wheels over which the chain passes.

My invention also comprises means for adjusting the apparatus vertically or transversely with relation to the log and means for securing it in position while the work is proceeding.

Figure 1:
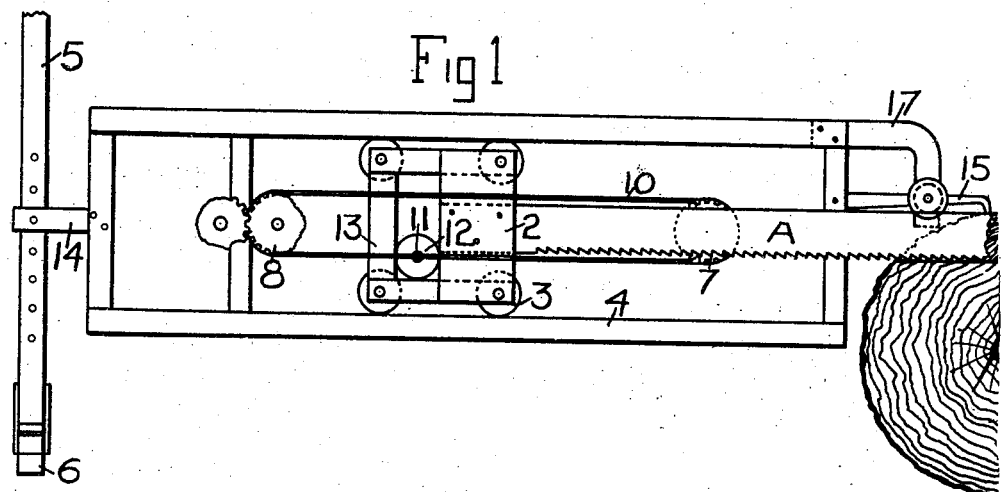
Figure 2:
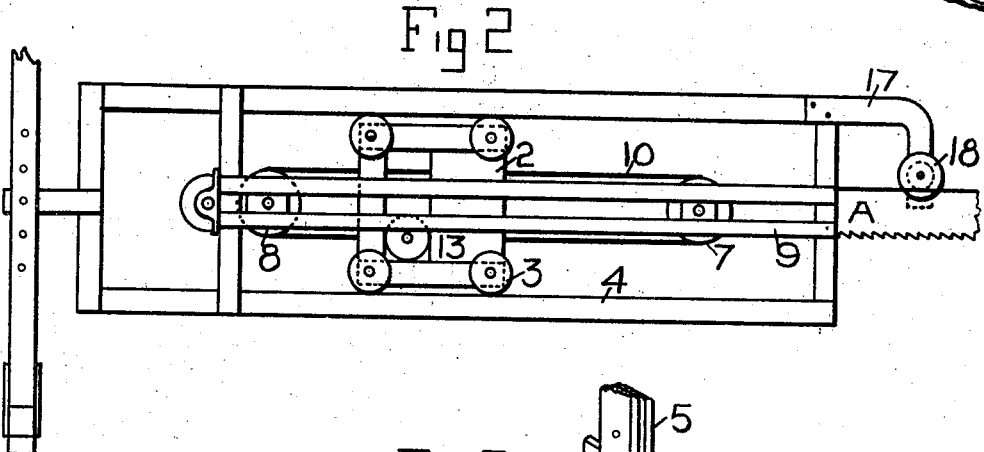
Figure 3:
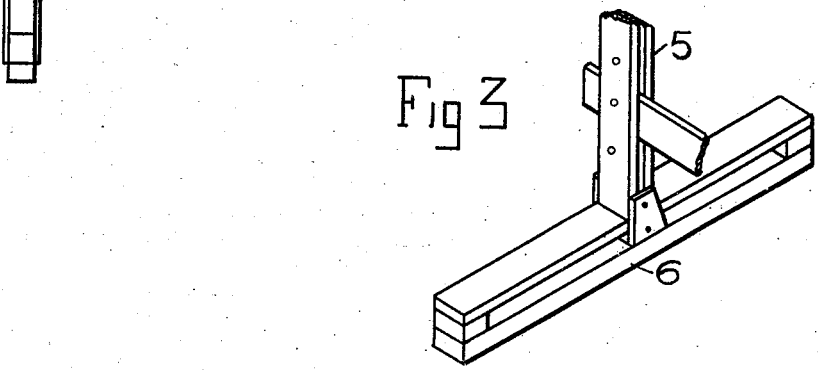

Referring to the accompanying drawings, Figure 1 is a section of the side elevation. Fig. 2 is a side elevation. Fig. 3 is a perspective view of the adjustable foot.

In the ordinary construction of mechanically-actuated drag-saws the reciprocating movement of the saw is effected by connecting it with a crank having a sufficient throw for the purpose; but such devices are limited in their effective operation by the length of the crank, and this cannot be greatly extended without being clumsy and difficult to operate. In my invention I make use of an endless chain passing around sprockets and connecting the saw with a suitably-guided traveler, which enables me to make the saw of such length as will be necessary for large trees and logs of six feet and upward in diameter.

As shown in the accompanying drawings, A is the saw, and 2 is a traveler, to which the rear end of the saw may be secured by bolting or other suitable means. This traveler has preferably antifriction-rollers 3 fixed at its angles, and these rollers are adapted to travel between guides 4.

7 and 8 are chain sprocket-wheels suitably mounted with relation to the guides 4. Any suitable arrangement may be made. I have here shown the journal-boxes of these sprocket-wheels as mounted upon timbers 9, which are substantially parallel with the guides 4 and intermediate between them. Thus by any suitable adjusting devices the distance between the pulleys 7 and 8 may be determined and regulated at will.

10 is a chain adapted to fit the sprocket-wheels 7 and 8, around which it passes. Upon one link or part of the chain 10 is fixed a journal-pin 11, upon which is mounted a roller 12. This roller fits between vertically-disposed guides 13 and is adapted to travel up and down between these guides. The length of the guide or channel in which the roller 12 travels is equal to or greater than the diameter of the sprocket-wheels about which the chain passes, so that as the chain reaches one of these sprockets and moves about it the roller 12 will move up the guides 13, and when the top of the sprocket-wheel has been reached it will return along the upper line of the chain, thus alternately passing around the upper and lower line of the chain. By this construction I am enabled to employ saws of great length and to increase the stroke indefinitely without using an unmanageably large crank or equivalent device for making the stroke.

It will be manifest that the apparatus will need adjusting from time to time in cutting logs of large diameter. I have therefore shown a post 5 provided with a suitable guide and mounted upon a horizontal base 6. A connecting bar or link 14 extends from the guide-frame 4 to the vertical standard 5 and may be secured thereto by a pin or bolt through the holes which are made in the vertical standard. The vertical standard 5 may also be secured to the horizontal base 6 at any desired point with relation to the work, and the guides 4 and the saw can thus be made to cut squarely across the log or at some angle therewith, if preferred.

In order to hold the apparatus properly with relation to the log, I employ dogs such as shown at 15, which are connected with the frame and may be driven into the log, thus holding the apparatus securely to its work.

Power may be transmitted to guide the chain-wheels 7 and 8 and the connected saw by means of any suitable or available motor, such as a steam or gas engine, water-power, or electrical motors when available. The power may be transmitted by gear chain or belt or by frictional pulleys or other equivalent means well known to the art.

The apparatus being portable may be easily set up wherever large trees or logs have fallen and it is desirable to cut them into shorter lengths.

In order to hold the saw to its work and to take advantage of the weight of the guide-frame and other parts, I have shown an arm 17 fixed to the guide-frame 4 and extending over the saw. To this arm is journaled a grooved pulley 18, which is adapted to rest upon the back of the saw, and thus add the weight of the device to keep the saw to its work. The pulley 18 may preferably be journaled between two parts of the arm 17, and the two sides may extend down upon each side of the saw-blade, so as to act as a guide and prevent the pulley from leaving the back of the saw.

Having thus described my invention, what I claim, and desire to secure by Letters Patent, is—

1. The combination with a saw of a traveler to which the end of the saw is secured, guides substantially in the line of the travel of the saw between which the traveler is movable, sprocket-wheels, an endless chain passing around said wheels, a connection between the chain and the traveler whereby power is transmitted to reciprocate the saw.

2. The combination in a sawing apparatus of a saw, a traveler to which the saw is secured, guides located substantially in the plane and line of travel of the saw, between which guides the traveler is movable, transverse guides carried by the traveler, a roller or the like, movable between said guides, said roller having a journal pin or a shaft, sprocket-wheels secured to the guide-frame of the traveler, an endless chain passing around said sprockets, said chain having an attachment to which the journal-pin of the transversely-moving guide-roller is secured.

3. The combination in a sawing apparatus of a saw, a traveler slidable between guides to which the saw is secured, timbers or supports substantially parallel with the guide to the traveler, sprocket-wheels adjustably fixed to said timbers, an endless chain passing around the sprockets, a journal-pin carried by the chain, a roller fitting said journal-pin, guides formed transversely upon the traveler in which said guides said roller is movable whereby it is adapted to follow the line of travel of the chain, and means for transmitting power to drive the chain and its sprockets.

4. The combination in a sawing apparatus of a saw, a traveler to which the saw is fixed, guides between which the traveler is movable, sprocket-wheels carried upon the guide-frame, an endless chain movable about said sprockets, a roller or like traveler fixed to the chain and adapted to travel therewith, a transverse guide in which said roller is movable upon the main traveler, a vertically and horizontally adjustable post and connections between the main traveler-guide and said post.

5. The combination in a sawing-machine of a saw, a traveler to which the saw is fixed, guides between which the traveler is movable, chain-wheel sprockets adjustably fixed in the line of travel of the saw, an endless chain passing around said sprockets, a connection between said chain and the traveler whereby the latter is caused to reciprocate a distance equal to the travel of the chain, means for adjusting the traveler guide-frame vertically and horizontally and a pressure device adapted to rest upon that of the saw and hold it to its work.

In testimony whereof I have hereunto set my hand in presence of two subscribing witnesses.

DANIEL E. CROUCH.

Witnesses:
  D. S. CHURCH,
  ALICE KELLY.